United States Patent [19]

Brock

[11] 3,802,582
[45] Apr. 9, 1974

[54] MASS FLOW ASPHALT STORAGE AND DISPENSING SYSTEM AND METHOD

[75] Inventor: James Donald Brock, Chattanooga, Tenn.

[73] Assignee: CMI Corporation, Oklahoma City, Okla.

[22] Filed: Sept. 28, 1971

[21] Appl. No.: 184,551

Related U.S. Application Data

[63] Continuation-in-part of Ser. No. 42,382, June 1, 1970.

[52] U.S. Cl.................. 214/17 C, 214/41, 214/152, 222/462
[51] Int. Cl.............................................. B65g 3/06
[58] Field of Search........ 214/17 R, 17 C, 41, 17 D; 222/460, 462, 181, 185

[56] References Cited
UNITED STATES PATENTS

| | | | |
|---|---|---|---|
| 3,586,181 | 6/1971 | Brock | 214/17 R |
| 3,071,297 | 1/1963 | Yee Lee | 222/462 |
| 3,390,918 | 7/1968 | Reinke | 214/17 C |
| 3,230,639 | 1/1966 | Welles | 214/17 C |
| 2,943,752 | 7/1960 | Platt | 214/17 D |
| 3,438,520 | 4/1969 | Williams | 214/17 C |
| 2,903,144 | 9/1959 | Stock | 214/17 R |

Primary Examiner—Robert G. Sheridan
Assistant Examiner—Kenneth Noland
Attorney, Agent, or Firm—Dunlap, Laney, Hessin & Dougherty

[57] ABSTRACT

An asphalt storage and dispensing system wherein asphaltic mix which includes aggregate of varying particle sizes is dropped in a vertical direction to a cylindrical storage bin so that the larger aggregate particles gravitate outwardly toward the bin walls and come to rest in a circular pattern in the bin and the finer aggregate particles are concentrated near the upright centerline of the cylindrical bin. The mix is moved in a mass flow in a downward direction through the cylindrical bin to a conical hopper, and is then moved with a mixing flow downwardly through the conical hopper in a range of angles generally between 65° and 90° from the horizontal so that the larger aggregate particles are remixed with the smaller aggregate particles, and the mix is dispensed from the lower end of the hopper through a rectangular outlet. As it receives the mix from the hopper, the receiving vehicle is moved beneath the hopper in a direction normal to the long dimension of the rectangular outlet of the hopper to prevent segregation of particle sizes in the vehicle.

4 Claims, 8 Drawing Figures

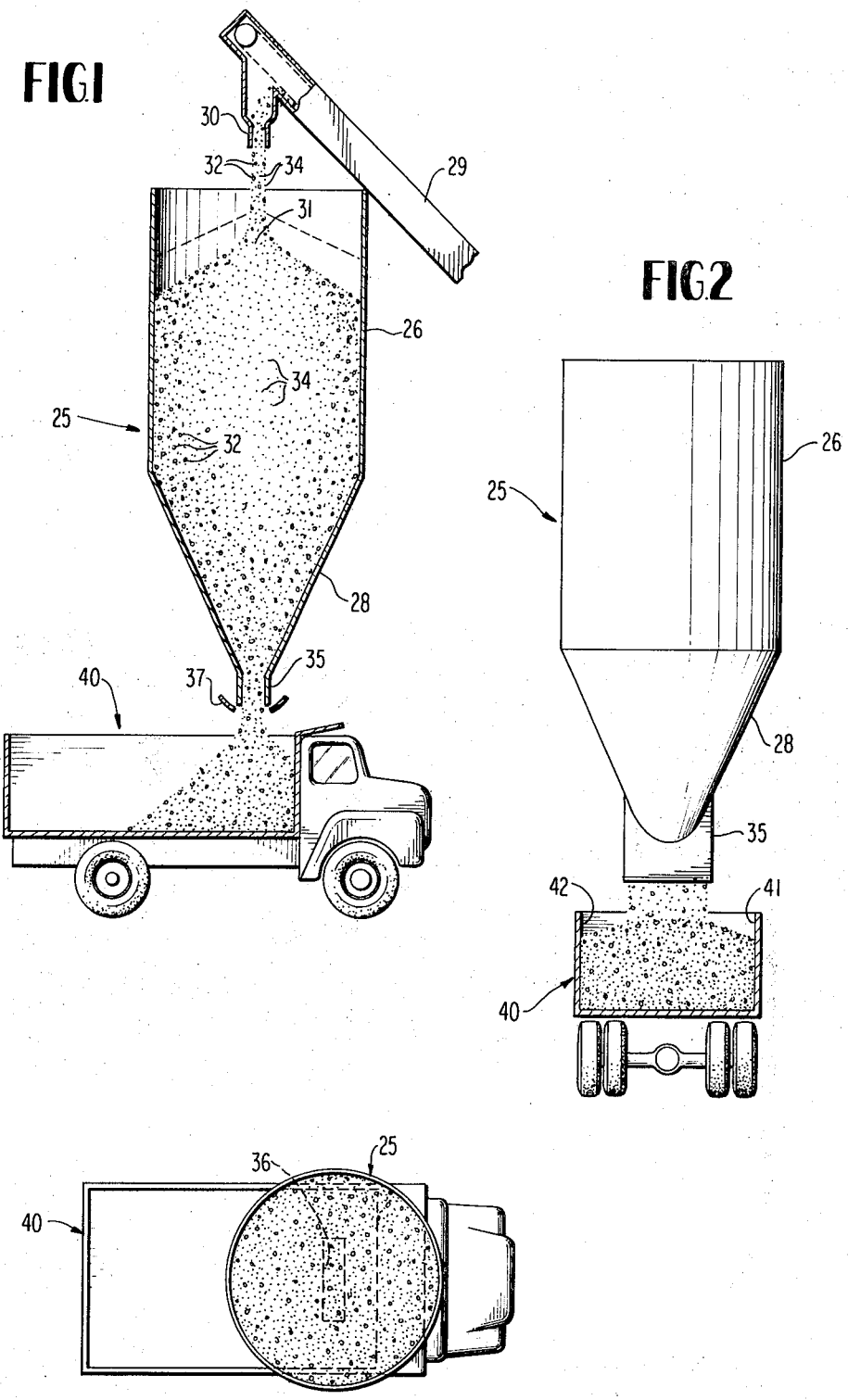

MASS FLOW ASPHALT STORAGE AND DISPENSING SYSTEM AND METHOD

CROSS-REFERENCE TO RELATED APPLICATION

This application is a continuation-in-part of application Ser. No. 42,382, filed June 1, 1970.

BACKGROUND OF THE INVENTION

When an asphalt mix which includes a bituminous liquid and rock aggregates of varying size is formed and delivered to a storage bin for temporary storage and ultimate dispensing to a vehicle for transportation to a construction site, it is difficult to maintain the larger and smaller aggregate particles uniformly mixed together in the storage bin, and when the mix is dispensed from the storage bin it is also difficult to dispense the mix from the chamber to the vehicle in a uniform blend of small and large aggregate particles, which is approximately how the mix was delivered to the storage bin. In a typical storage structure, the asphalt mix is delivered to the top of a cylindrical bin by means of a drag chain conveyor or bucket conveyor. When the mix is dropped into the storage bin there is usually some lateral movement or trajectory of the mix as it falls to the mass of mix in the bin. The larger particles of the mix tend to travel further than the smaller particles during the drop so that the mix tends to land and settle in the cylindrical chamber with the larger particles positioned on one side of the chamber and the smaller particles positioned generally on the opposite side. As the mass of mix in the storage chamber increases, it usually forms a peak or apex at the position where the mix first lands in the chamber, and the incline of the apex causes the larger aggregate particles in the mix to tumble and roll down the incline of the mix toward the walls of the container, while the smaller particles tend to remain near the top or center of the apex.

If the storage container is improperly loaded with the larger aggregate particles positioned generally on one side of the container, the mass flow characteristics of the mix within the container are inhibited since the flow friction of the particles varies in accordance with the particle sizes and the smaller particle sizes usually flow more freely and will be dispensed sooner than the coarse material. This results in a segregated delivery of the asphalt from the storage bin to the vehicle and from the vehicle to the construction site.

Moreover, when the mix is dispensed from the storage bin to a truck or other vehicle, a similar phenomenon occurs in that the mix forms a pile of mix in the truck bed and the larger aggregate particles roll down the incline of the pile. This positions the larger particles at the side walls of the truck bed, and when the mix is removed from the truck, usually by tilting the truck bed to dump the mix, the larger and smaller aggregate particles are segregated from each other when the mix is deposited on the ground.

SUMMARY OF THE INVENTION

Briefly described, the present invention comprises an asphalt storage and dispensing system which functions to dispense asphalt mix substantially without any segregation of the larger and smaller aggregate particles appearing in the dispensed mix as the mix leaves the storage bin, and the mix is delivered to the truck bed in a manner that inhibits segregation of the aggregate particles in the truck bed. The mix is initially delivered from a pug mill or the like in a generally vertical direction to the centerline of an upright conical storage bin so that after a mass or pile of mix is accumulated in the bin and an apex of mix is formed, the larger aggregate particles of the mix will tend to gravitate or roll down the incline of the pile and come to rest in a circular arrangement adjacent the wall of the storage bin. When the mix is dispensed from the storage chamber the mix is moved in a mass flow arrangement in a downward direction through the cylindrical portion of the storage bin until it reaches the conical hopper beneath the storage bin, and the larger particles of the mix from the outer circle of mix are blended with the smaller particles as the mix moves downwardly through the conical hopper. The conical hopper is formed with a side wall structure which is inclined at an angle of at least 65° from the horizontal and the mix flowing through the conical hopper is forced to move downwardly and inwardly toward the centerline of the hopper within a range of angles between 65° and 90° from the horizontal, which forces the blending together of the mix from the various areas of the hopper and prevents a plug flow pattern from being created.

The outlet opening at the bottom of the conical hopper is rectangular and the truck below the conical hopper is positioned with its longitudinal centerline extending normal to the long dimension of the rectangular outlet opening, and the truck is moved forwardly beneath the conical hopper as the mix is dispensed to the truck. This inhibits particle separation in the truck bed.

Thus, it is an object of this invention to provide an asphalt storage and dispensing system which functions to deliver a mix having uniformly distributed aggregate particles which vary in size from a storage bin to a truck bed.

Another object of this invention is to provide a storage and dispensing system which is capable of storing and dispensing an asphalt mix having a large variance in aggregate particle sizes, including aggregate particles up to and exceeding two inches in diameter, generally without causing segregation of the larger and smaller aggregate particles.

Other objects, features and advantages of the present invention will become apparent upon reading the following specification, when taken into conjunction with the accompanying drawing.

BRIEF DESCRIPTION OF THE DRAWING

FIG. 1 is a schematic side elevational view with parts shown in cross section of the asphalt storage and dispensing system.

FIG. 2 is a schematic side elevational view of the asphalt storage and dispensing system, similar to FIG. 1 but with the system turned 90°.

FIG. 3 is a schematic top view of a storage bin and truck positioned beneath the storage bin.

DESCRIPTION OF THE PREFERRED EMBODIMENT

Figure 7:
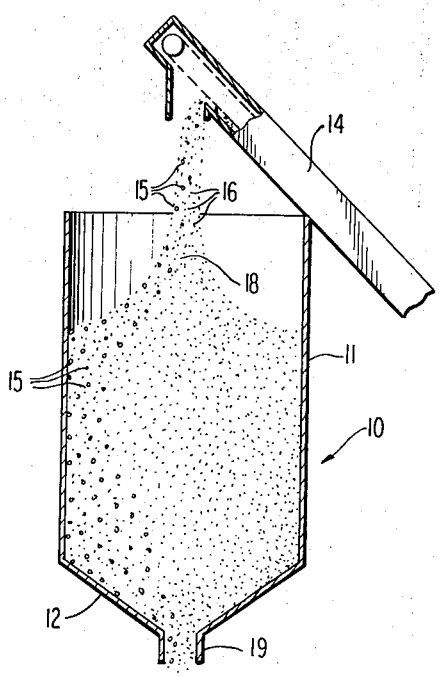
FIGS. 7 and 8 are schematic side elevational views, similar to FIG. 1, but showing the prior art.

Referring now in more detail to the drawing, in which like numerals indicate like parts throughout the several views, FIG. 7 illustrates the prior art wherein the storage container 10, which comprises a cylindrical bin 11 and a conical hopper 12, receives asphalt mix from a drag chain conveyor 14. As the mix is delivered to the storage container, the momentum of the mix as it falls from the conveyor causes the larger particles 15 of the mix to be thrown further in the direction of movement of the mix than the smaller particles 16. As the mix drops into the bin 11, the mass of mix tends to form a conical pile of mix with sloping sides and an apex 18 and the larger particles 15 falling from conveyor 14 tend to roll and tumble down the incline of the pile toward the far end of the bin from the conveyor while the smaller particles tend to stay near the center of the mass of the mix. The result is that most of the larger aggregate particles are located in one vertical quadrant of the bin while the remaining portion of the bin is filled with smaller aggregate particles.

Figure 8:
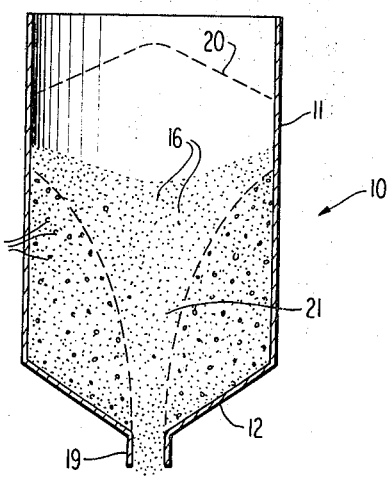

When the discharge chute of the hopper 12 is opened, the mix will be dispensed from the discharge chute to the waiting truck or conveyor. When mix is present in the storage container that includes an aggregate mixture that varies widely in particle sizes, and when the particles are segregated as illustrated in FIG. 7 or segregated with the larger particles located in a circle or annulus by the bin side wall as illustrated in FIG. 8, the typical hopper 12 having a shallow incline functions to discharge the mix in a plug flow pattern and the conical-shaped upper surface of the mass of mix as indicated by the dashed lines 20 of FIG. 8 dissipates. A plug flow pattern 21 in the mix extends upwardly through the mass of the mix from discharge chute 19. If the mix is distributed from a shallow bin loaded as illustrated in FIG. 7 with the larger aggregate particles to one side of the mass of the mix, or if the mix is distributed from a shallow bin loaded as illustrated in FIG. 8 with the larger aggregate particles located in a circular arrangement adjacent the wall of the storage bin 11, the plug flow pattern 21 will tend to dispense primarily only the smaller aggregate particles 16 from the mass of the mix, leaving the larger aggregate particles 15 behind until a large portion of the small aggregate particles have been dispensed.

As is illustrated in FIG. 1, the present invention comprises a storage container or bin 25 that includes an upright cylindrical storage bin 26 and an approximately conical hopper 28 connected to the bottom of bin 26 and which has a sloping side wall disposed at an angle of at least 65 degrees from the horizontal.

Conveyor 29 includes a discharge conduit 30 that is of sufficient length and is of a diameter which functions to control the flow of asphalt mix falling from the delivery end of the conveyor to the storage bin, so that the mix falls approximately in a vertical direction and generally along the centerline of storage bin 26. The arrangement is such that when the mass of mix begins to build up in the storage container 25, an apex or mound 31 is formed and the pile of mix has a conical upper surface. As the larger particles 32 fall toward the apex of the pile of mix from the discharge 30 of the conveyor, the larger particles will tend to tumble and roll down the incline of the mass of the mix toward the wall of storage bin 26. In the meantime, the small particles 34 will not tend to roll or tumble as easily as the larger particles and will tend to stay near the center of the mass of mix in storage bin 26. The result is that the largest size particles 32 will generally come to rest in a circular arrangement and an annulus of larger particles is formed about the smaller sized particles 34 in storage bin 26.

When the discharge chute 35 at the lower end of hopper 28 is opened by the removal of clam gates 37 to dispense the mix from the storage container, the slope of the walls of the hopper inhibits a plug flow pattern or funnel flow pattern from being created in the mass of the mix and the mix will flow as a mass in a downward direction toward the lower end of cylindrical storage bin 26, and when the mix enters the conical hopper 28 the outer circular portion of the mix which includes the larger aggregate particles will tend to move down the incline of the hopper and become remixed with and blended with the smaller aggregate particles near the center of the mass. Thus, conical hopper 28 becomes a mixing chamber to remix the previously segregated aggregate particles which were segregated generally in accordance with size.

While FIG. 8 illustrates the prior art storage container with a shallow hopper that creates a plug flow pattern in the mass of the mix, this phenomenon will be better understood if the hopper 12 of the prior art were envisioned as being a virtually horizontal bottom wall to storage bin 11. Obviously the opening of a small hole in a large bottom wall would cause a plug flow pattern in the mass of the mix being dispensed through the hole. When the slope of the bottom wall structure is increased, the tendency of the plug flow pattern to form is reduced. However, when the difference in aggregate particle sizes of the mix is increased and the larger particles are arranged in an annulus along the sides of the cylindrical bin, the tendency of a plug flow pattern being created is increased. Thus, while a storage bin having a relatively shallow conical hopper of as little as 45° incline might provide mass flow in an asphalt mix having its largest aggregate particles approximately one-fourth inch in diameter, when the larger aggregate particles are increased to approximately 2 inches, the shallow incline of the hopper is insufficient to remix the aggregate particles together and a plug flow pattern will appear. In practice, it has been found that it is necessary to construct the side walls of the hopper 28 of the present invention at an incline of at least 65° from the horizontal in order to remix the segregated aggregate particles if the aggregate particles are as much as approximately 2 inches in diameter. When the aggregate particles exceed 2 inches in diameter, no plug flow patterns have been detected in the bins having 65° hoppers and when the bins are loaded with the large particles arranged in an annulus adjacent the side walls of the bin. It is desirable to have the larger aggregate particles formed in a circular arrangement in the storage bin 26 instead of being concentrated in one portion of the bin to assure that the larger aggregate particles moving down through the conical hopper feed inwardly from the periphery of the mass into the smaller aggregate particles at the center portion of the mass. If the larger aggregate particles are allowed to form in one vertical section of the storage bin as is illustrated in FIG. 7, a slight plug flow pattern is occasionally created in the mass of mix and segregation of the dispensed mix is occasionally detected in spite of the steep incline of the hopper walls.

While it is acceptable to store the mix in bin 25 with the larger particles segregated adjacent the sides of the bin since the particles are remixed in conical hopper 28, it is undesirable to receive the mix in the bed of the dump truck, etc., in a segregated pattern, as where the pile of mix is dispensed to the truck bed and the larger particles tend to roll down the incline of the pile of mix in the truck bed and settle at the side walls of the truck. When the bed of a truck is tilted to dump segregated mix, the mix usually falls in a segregated pattern on the ground. For instance, the larger particles adjacent the back wall of the truck bed will be dispensed from the truck first and the larger particles adjacent the front wall of the truck bed will be dispensed last while the larger particles at the side walls of the truck will be dispensed at the sides of the pile of mix deposited on the ground.

As is best illustrated in FIGS. 2 and 3, discharge chute 35 is connected to the lower portion of conical hopper 28 and forms a rectangular opening 36 at the lower end of the hopper. Trucks 40 or similar load carrying vehicles are able to pass beneath the elevated structure, and the support for the structure (not shown) is arranged to allow the truck to pass with its longitudinal axis extending normal to the long dimension of the rectangular opening 36 of the discharge chute 35. In the particular embodiment of the invention illustrated, discharge opening 36 is 1 foot wide and 4 feet in length. The typical bed of a dump truck is approximately 8 feet wide and 15 feet long. Thus, the length of the discharge chute opening 36 which extends across the truck bed is approximately half the width of the truck bed. The cylindrical bin 26 of the particular disclosed embodiment has an 11 foot inside diameter, and the slope of the conical hopper 28 is 70°. As the mix moves down the conical hopper 28, the portions of the mix adjacent the side walls of the hopper which move into the ends of the discharge chute will not have to move in a lateral direction as far as the portions of the mix moving down the sides of the hopper toward the center portion of the opening 36. The result appears to be that the rectangular discharge opening 36 further tends to inhibit a plug flow pattern from being formed in storage bin 25.

As is illustrated in FIGS. 2, 4, 5 and 6, the dispensing of the mix from the discharge chute 35 in a rather thin but wide pattern causes the mix to be placed at the center of the truck bed and also relatively close to the side walls 41 and 42 of the truck bed. As a result, the slope of a pile of mix formed in the truck bed is not as steep across the truck bed as it would be if the mix were discharged from a discharge chute of round or square horizontal cross section. Thus, when the larger particles of the mix fall onto a pile with a more shallow slope, they do not tend to roll and tumble as far as they would on a pile having a more steeply inclined surface. Furthermore, when the mix is dispensed near a vertical side wall, there is less distance for the mix to travel before it reaches a side wall and the larger and smaller particles tend to tumble about the same distance toward the side wall. The side walls of the truck bed therefore prevents extensive lateral movement of the rolling or tumbling particles of mix and inhibit segregation of the larger and smaller particles.

Figure 4:
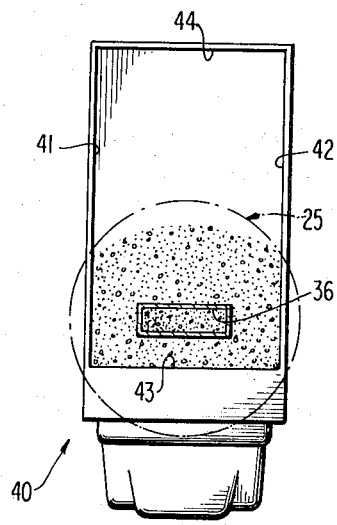
FIGS. 4–6 are progressive schematic illustrations of the manner in which a truck is filled with aggregate.
Figure 5:
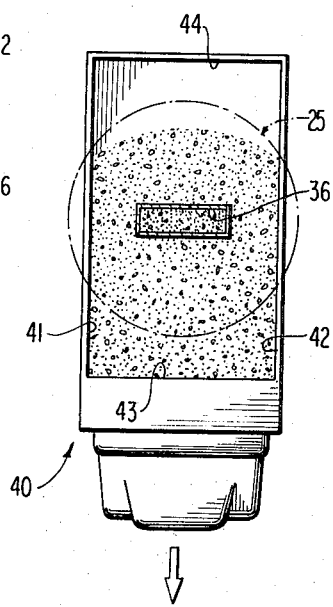
Figure 6:
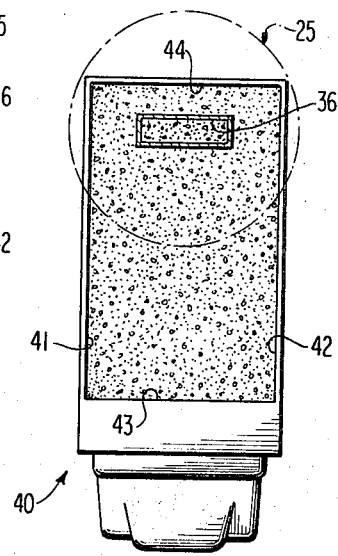

When the truck 40 is first placed below the storage bin 25, the driver positions the truck so that the front wall 43 of the truck bed is just forward of discharge chute 35, by approximately 2 feet or so. When the clam gates 37 are moved to open the rectangular opening 36 of the discharge chute 35, the mix will be dispensed to the truck bed, and when the mix begins to form a pile with a sloped surface in the truck bed, the larger particles of mix will usually tend to roll down the slope of the pile; however, since the mix is dispensed adjacent the front wall 43 of the truck bed, front wall 43 will tend to catch the rolling and tumbling large particles of mix and prevent them from rolling a long distance toward the front of the truck, and since the rectangular discharge opening 36 has its long dimension extending across the centerline of the truck, side walls 41 and 42 will catch the rolling large particles of mix which happen to roll down the incline of the pile toward the sides of the truck. Thus, the rolling of the larger particles of mix is restrained on three of four sides of the pile of mix in the truck and only the slope of the pile of mix extending toward the rear wall 44 of the truck bed allows the larger particles to roll and tumble down the incline of the pile. As the truck bed becomes full adjacent front wall 43, the driver moves the truck forwardly to reposition the discharge chute 35 of the bin 25 with respect to the truck bed. As is illustrated in FIGS. 5 and 6, the truck bed is progressively filled from its front toward its rear. As the truck moves in a forward direction, the mix piled in the front portion of the truck bed inhibits any rolling and tumbling of the larger mix particles toward the front wall 43 of the truck bed, while side walls 41 and 42 continue to restrain the lateral tumbling of the larger particles as previously described. In addition, new mix is dispensed to the truck over the portion of the pile sloped toward the rear wall 44 of the truck, and the new mix tends to trap a portion of the larger particles on the surface of the first pile by falling on the pile. There may be some accumulation of larger mix particles on the flat surface of the truck bed and possibly some accumulation of larger mix particles adjacent the rear wall 44 of the truck bed; however, the body or mass of mix in the truck bed will be substantially free of accumulation of larger mix particles in any isolated area of the truck bed, so that a generally uniform mixture of particle sizes will be present in the mass of mix in the truck.

While this invention has been described in detail with particular reference to preferred embodiments thereof, it will be understood that variations and modifications can be effected within the spirit and scope of the invention as described hereinbefore and as defined in the appended claims.

I claim:

1. A storage apparatus for asphaltic mix including aggregate particles of various sizes and comprising a storage container including an upper upright cylindrical storage bin and a lower approximately conical hopper connected to and converging inwardly from the sides of the lower portion of the cylindrical storage bin at an angle of at least 65° from the horizontal, support means supporting said storage container at an elevated position above the ground surface or the like and defining a passageway beneath said lower conical hopper for the passage therebeneath of trucks or the like, a rectangular outlet opening defined in the lower portion of said conical hopper having its long dimension extending across the passageway beneath said conical hopper, and conveyor means extending above said storage bin to deliver the mix in a substantially vertical direction and substantially along the upright centerline of the storage bin.

simultaneously flowing the mix downwardly through the conical hopper in a range of angles generally between 65° and 90° from the horizontal and mixing the aggregates of larger particle size from the outside and around the mass of mix with the rest of the mix, dispensing the mix through a rectangular opening; and moving a receiving container with respect to the conical hopper below the rectangular opening in a direction normal to the long dimension of the rectangular opening to receive and spread the mix in the container.

2. A method of storing and dispensing an asphaltic mix including aggregates of varying particle size comprising flowing the asphaltic mix in a generally vertical direction to an upright cylindrical storage bin, distributing the aggregate of larger particle size generally toward the outside and generally in a circular pattern around the mass of mix in the storage bin, flowing the mix generally as a mass in a downward direction in the storage bin to a conical hopper, simultaneously flowing the mix downwardly through the conical hopper in a range of angles generally between 65° and 90° from the horizontal and mixing the aggregates of larger particle size from the outside and around the mass of mix with the rest of the mix, and dispensing the mix from the hopper.

3. A method of storing and dispensing an asphaltic mix including aggregates of varying particle size comprising flowing the asphaltic mix in a generally vertical direction to an upright cylindrical storage bin, distributing the aggregate of larger particle size generally toward the outside and generally in a circular pattern around the mass of mix in the storage bin, flowing the mix generally as a mass in a downward direction in the storage bin to a conical hopper, simultaneously flowing the mix downwardly through the conical hopper in a range of angles generally between 65° and 90° from the horizontal and mixing the aggregates of larger particle size from the outside and around the mass of mix with the rest of the mix, dispensing the mix through a rectangular opening; and moving a receiving container with respect to the conical hopper below the rectangular opening in a direction normal to the long dimension of the rectangular opening to receive and spread the mix in the container.

4. The method of claim 2 and further including the step of maintaining the level of the asphaltic mix above the conical hopper.

* * * * *

UNITED STATES PATENT OFFICE
CERTIFICATE OF CORRECTION

Patent No. 3,802,582            Dated April 9, 1974

Inventor(s) James Donald Brock

It is certified that error appears in the above-identified patent and that said Letters Patent are hereby corrected as shown below:

In column 7, delete lines 1 through 13.

Signed and sealed this 30th day of July 1974.

(SEAL)
Attest:

McCOY M. GIBSON, JR.
Attesting Officer

C. MARSHALL DANN
Commissioner of Patents